Figure 1:

J. F. O'CONNOR.
PROCESS OF MAKING MULTIPLE PIECE SPRINGS.
APPLICATION FILED MAR. 10, 1921.

1,429,690. Patented Sept. 19, 1922.

Witnesses
Wm. Geiger

Inventor
John F. O'Connor
By Geo. I. Haight
His Atty.

Patented Sept. 19, 1922.

1,429,690

UNITED STATES PATENT OFFICE.

JOHN F. O'CONNOR, OF CHICAGO, ILLINOIS, ASSIGNOR TO WILLIAM H. MINER, OF CHAZY, NEW YORK.

PROCESS OF MAKING MULTIPLE-PIECE SPRINGS.

Application filed March 10, 1921. Serial No. 451,238.

*To all whom it may concern:*

Be it known that I, JOHN F. O'CONNOR, a citizen of the United States, residing at Chicago, in the county of Cook and State of Illinois, have invented a certain new and useful Improvement in Processes of Making Multiple-Piece Springs, of which the following is a full, clear, concise, and exact description, reference being had to the accompanying drawings, forming a part of this specification.

This invention relates to improvements in process of making multiple-piece spring.

In certain shock absorbing mechanisms, particularly those employed in railway draft riggings, it is customary to use coil springs formed of heavy rods. Due to the limited space within which such shock absorbing mechanisms are accommodated and the short stroke of the coupler which is permitted, generally 2¼" to 2½", it is impossible to obtain the necessary capacity from springs alone to cushion the blows which are encountered in present day railway service. Consequently, it has been necessary to augment the spring capacity by the use of friction creating elements, this art having now been developed to a very high degree.

For a friction shock absorbing mechanism to be successful in present day practice for railway draft riggings, it is necessary that the device be capable of absorbing shocks of 200,000 to 400,000 pounds. The maximum capacity of the springs employed in such devices has heretofore ranged between 30,000 and 40,000 pounds per spring unit. In some types of devices only one spring unit is employed and in others two spring units so that the capacity which must be developed in the friction devices ranges from a minimum of approximately 160,000 pounds to a maximum of approximately 370,000 pounds. It has long been recognized that heavy duty springs of the character indicated without requiring excessive fiber stresses, having a larger capacity than above described, are desirable in order that less work may be required of the friction devices and thereby prolong the life of the shock absorbing mechanisms.

It has also long been recognized that a helically coiled spring having a plurality of turns does not have any greater capacity than a spring of similar pitch, similar coil diameter and similar material having only a single turn although the strokes or compression movements of the two springs may vary. It is therefore possible to obtain a spring of double, triple or even greater capacity without changing the pitch, coil diameter, size of the material forming the spring, or increasing the fiber stresses by making the spring in a multiple of pieces and allowing adjacent turns of the pieces to lie in line contact throughout arcs of substantially 360°, the capacity of such multiple-piece springs being dependent upon the number of such turns which are in line contact.

The object of my invention is to provide a very simple method or process of making such multiple-piece springs having greater capacity than the present type of continuously coiled spring and whereby the same machinery now employed in coiling the present types of springs may be utilized without modification.

Figure 2:
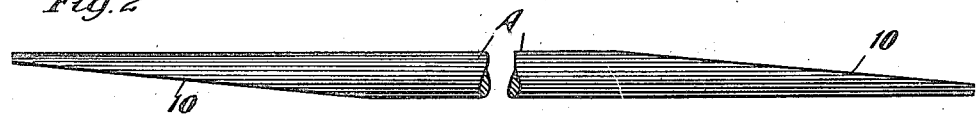
Figure 3:
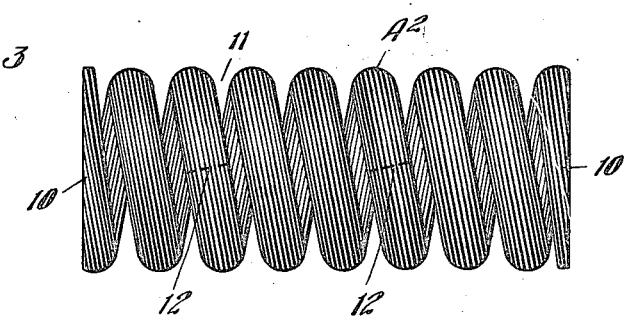
Figure 4:
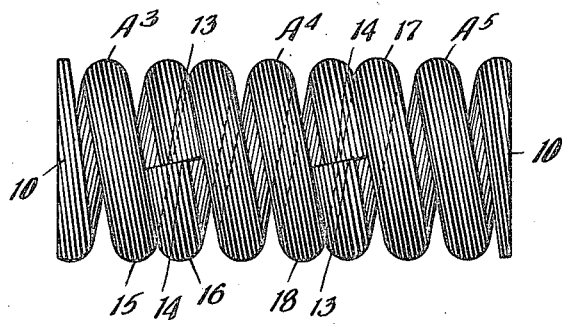

In the drawing forming a part of this specification, I have illustrated the steps employed in my improved process for manufacturing a multiple-piece spring of the type indicated. In said drawing, Figure 1 is an elevational view of a length of cylindrical rod cut to proper length for coiling into a continuous helical spring having an over-all uncompressed length greater than the desired over-all uncompressed length of the finished multiple-piece spring. Figure 2 is a view similar to Figure 1 showing the first step in the process of making the spring and wherein the ends of the rod are tapered to provide the usual flat ends for the coil spring. Figure 3 is an elevational view of a continuously coiled helical spring formed from the rod illustrated in Figures 1 and 2. In Figure 3 is illustrated two lines of severance of the coil in order to obtain the multiple-piece finished spring which, in the instance shown, contains three pieces. And Figure 4 is a view similar to Figure 3 illustrating the completed multiple-piece spring.

In carrying out my invention, I first cut off a section of rod A to the desired length, said rod being of cylindrical form and of the desired diameter and material. The rod A is then tapered or flanged at its ends to the form indicated at A' in Figure 2, the beveled ends being shown at 10—10, the same being oppositely disposed at the ends of the rod so as to bring the tapered tangs of the finished spring in proper position. The tapering of the ends of the rod to the form shown at A' in Figure 2 may be done in any suitable manner, preferably by a trip hammer while the rod is at a high temperature.

After the rod A' has been formed as shown in Figure 2 and while still at a high temperature, it is then coiled into a continuous helix of the desired pitch, and coil diameter to the form shown at $A^2$ in Figure 3, this step being carried out by any one of the well known types of spring coiling machines and in such manner as to bring the tapered ends 10—10 as shown and thus provide flat bearing surfaces at each end of the spring. Where the multiple piece spring is to consist of three pieces as shown in Figure 4, the spring as initially formed in a continuous helix as shown at A in Figure 3, will have an over-all length, uncompressed, equal to that of the desired over-all length of the finished spring plus twice the space as indicated at 11 between each turn of the helix. When the spring is in the form shown at $A^2$ in Figure 3, it will be tempered and tested in the usual manner.

The final step in the process consists in cutting or severing the continuous helix into three parts at two places intermediate the ends of the coil as indicated at 12—12 in Figure 3, the lines of severance being preferably in planes perpendicular to the axis of the coil-forming rod. The cutting or severance of the coil into the three pieces indicated may be done by use of an electric arc, oxy-acetylene flame or other desired means. Severing of the coil into the three pieces which may be designated as $A^3$, $A^4$, and $A^5$ results in the end pieces $A^3$ and $A^5$ having their inner ends squared as indicated at 13—13 and the intermediate piece $A^4$ with both of its ends squared as indicated at 14—14. After the three individual pieces are formed as above indicated, they are nested so that the innermost turn or coil 15 of the end piece $A^3$ is in line contact throughout an arc of substantially 360° with the adjacent end turn or coil 16 of the intermediate piece $A^4$. Similarly, the innermost turn or coil 17 of the other end piece $A^5$ is in continuous line contact throughout an arc of substantially 360° with the adjacent end turn or coil 18 of the intermediate piece $A^4$. The over-all length of the finished multiple-piece spring shown in Figure 4 is obviously less than that of the continuous coil shown in Figure 3 by an amount equal to twice the space 11 between turns shown in Figure 3.

The capacity of the spring shown in Figure 4 is twice that of the usual type of continuously coiled spring such as shown in Figure 3, due to the line contacts between the adjacent end coils of the parts as hereinbefore described. The compression stroke or movement of the finished spring shown in Figure 4 will correspond to five spaces between turns as compared to a stroke corresponding to seven of such spaces in a spring of the continuous type such as shown in Figure 3. As will be obvious to those skilled in the art, various combinations of capacities and compression stroke may be made by varying the numbers of pieces and the numbers of turns which are allowed to be nested in line to line contact. The finished spring shown in Figure 4 has the flat bearing ends as customary in heavy duty springs of the type referred to; its length may be made such as to adapt it to present spaces allowed for springs of this type; and it is evident that the cost of manufacture is not appreciably greater than that of springs of the present continuously coiled type.

I have illustrated and described the process of manufacturing one multiple-piece spring only. In railway draft riggings, it is customary to have the springs composed of an outer heavy coil and an inner lighter nested coil. It is evident that the same process may be employed in connection with an inner lighter nested coil as shown in the drawing in connection with the usual outer heavy coil.

I have herein shown and described what I now consider the preferred manner of carrying out the invention, but the same is merely illustrative and I contemplate all changes and modifications that come within the scope of the claims appended hereto.

I claim:

1. The herein described process of making a multiple-piece, helically coiled spring wherein adjacent turns of the pieces are in line contact for approximately 360° which consists in: forming a single piece helically coiled spring consisting of a plurality of continuous, axially spaced turns of the desired pitch and coil diameter and of an uncompressed over-all length greater than that of the desired finished multiple-piece spring; then serving one of the intermediate turns of said coiled initially formed spring; and then nesting the pieces so formed with adjacent turns of the severed pieces in line contact throughout an arc of substantially 360°.

2. The herein described process of making a multiple-piece helically coiled spring wherein adjacent turns of the pieces are in line contact for approximately 360°, which consists in: forming a single piece, helically coiled spring consisting of a plurality of continuous, axially spaced turns of the desired pitch and coil diameter and of an uncompressed over-all length greater than the uncompressed over-all length of the desired finished multiple-piece spring; then severing one of the intermediate turns of said coiled initially formed spring in a plane substantially perpendicular to the axis of the coil-forming material; and finally nesting the pieces so formed with adjacent turns of the severed pieces in line contact throughout an arc of substantially 360°.

3. The herein described process of making a multiple-piece, helically coiled spring wherein adjacent turns of the pieces are in line contact for approximately 360° and the ends of the spring provided with flat bearings, which consists in: providing a rod of the desired material and suitable length; oppositely tapering the ends of said length of rod material; then coiling said rod into a single piece helical spring consisting of a plurality of continuous, axially spaced turns of the desired pitch and coil diameter and with the tapered ends of the rod to provide flat bearings; then severing one of the intermediate turns of said coiled initially formed spring; and finally nesting the pieces so formed with adjacent turns of the severed pieces in line contact.

4. The herein described process of making a multiple-piece, helically coiled spring wherein adjacent turns of the pieces are in line contact for approximately 360° and the ends of the spring providing flat bearings, which consists in: first providing a section of rod material of the desired length and quality; then oppositely tapering the ends of said section of rod; then coiling said section of rod into a continuous helix of desired pitch and coil diameter with the tapered ends so arranged as to provide flat bearings at the ends of the helix; tempering the coil so formed; then severing one of the intermediate turns of said continuously coiled spring in a plane substantially perpendicular to the coil-forming rod; and finally nesting the pieces so formed with adjacent turns of the severed pieces in line contact throughout an arc of approximately 360° and with the severed ends of the pieces abutting each other.

In witness that I claim the foregoing I have hereunto subscribed my name this 21st day of Feb., 1921.

JOHN F. O'CONNOR.

Witnesses:
CARRIE GAILING,
UNA C. PERIN.